Patented Oct. 18, 1927.

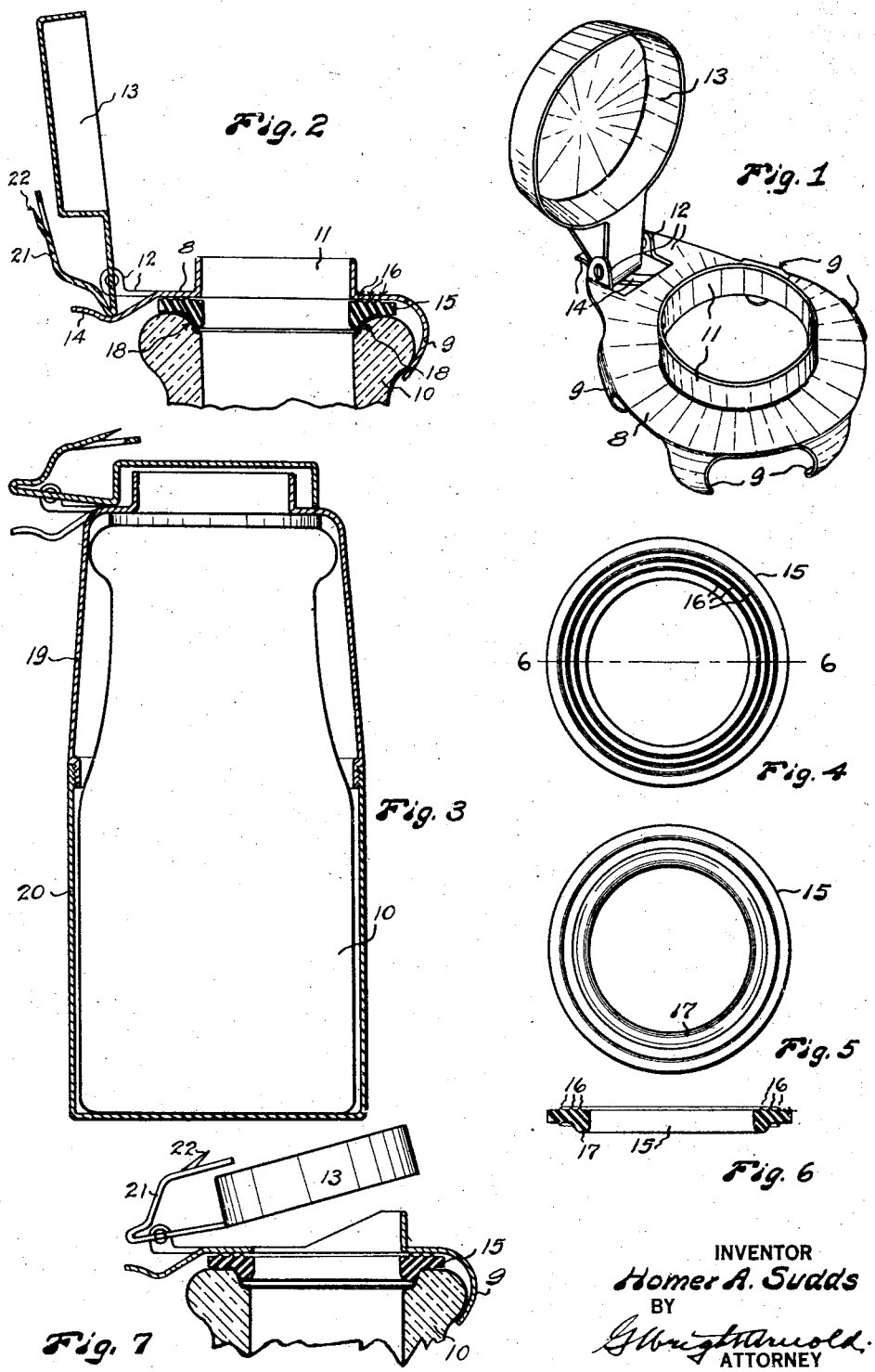

1,645,829

UNITED STATES PATENT OFFICE.

HOMER A. SUDDS, OF EVERETT, WASHINGTON.

BOTTLE-CONTAINER CLOSURE.

Application filed June 7, 1926. Serial No. 114,073.

My invention relates to a bottle container closure.

My invention will be described for purposes of clearness of illustration as particularly applied to a closure for milk bottle containers, but of course the invention is not to be deemed as limited to any such specific application, but is inclusive of all closures involving like problems and conditions.

Milk, as ordinarily marketed, is delivered in milk bottles, and it is well known that the tops of these bottles become insanitary, so that when the contents of the milk bottle are poured out, the milk comes in contact with the insanitary top portion. A primary purpose of my invention is to provide a closure to be applied by the consumer of the milk of a character which will prevent the milk from coming in contact with, and thereby avoid danger of contamination of the milk from, the said exposed top portion.

Furthermore, a primary object of my invention is to provide a closure which will convert said bottle into a container from which the milk may be readily poured and used on the table in the place of the ordinary milk pitcher.

Also, a primary purpose of my invention is to provide a gasket to function in combination with the said closure which will prevent the milk from coming in contact with the top and inner edge top portion of the bottle.

Further, a primary purpose of my invention is to provide a closure which will provide a cover at all times to the portion from which the milk is poured, and a closure which is characterized by having means which will prevent the unintentional entry of liquids to the inside of the bottle.

And, finally, a primary object of my invention is to provide a closure for a bottle container which will be characterized by its economical manufacture.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a view in perspective of a closure embodying my invention with the cover in open position;

Fig. 2 is a side view in section of the said closure applied to a milk bottle container top;

Fig. 3 is a view of a modified form of a closure embodying my invention designed to enclose the entire bottle;

Fig. 4 is a top view of a gasket to be employed in combination with my invention;

Fig. 5 is a view on reverse side of said gasket;

Fig. 6 is a view in section on dotted line 6, 6 of Fig. 4; and

Fig. 7 is a side view in section of a modified form of closure embodying my invention.

A top member 8 is provided with clamping means 9 by which the same may be secured to the top of a bottle 10. A vertically directed flange 11 is disposed about the edge of an axially disposed opening in said member. Laterally directed lugs 12 provide means for hingedly mounting a cover 13, while spring 14 provides means for releasably securing said cover in open position. Gasket 15 is disposed on the under side of the top member 8, so that it may be held under pressure against the top of said bottle. The gasket is provided with the ribs 16 which assist in making a tight closure against the top member, and the downwardly directed flange 17 prevents the milk from coming in contact with the top of the bottle and the top inner edge portion 18 of the bottle or container.

In the modified form, shown in Fig. 3, the closure comprises a top member 19 extending well down the sides of the bottle and a bottom portion 20 disposed to be releasably secured to said top member, and forms a complete case for said bottle, thereby providing a closure presenting a neater appearance.

Instead of the preferred form, namely, the upwardly directed flange 11, the flange may extend only part way about the axially disposed opening in the top member 8 to form a spout. The flange as shown in Fig. 1 is the preferred form so that it precludes any water, as water of condensation in a refrigerator, or other fluids, which may come in contact with the top member, from running into the container.

The cover handle 21 may be provided with a pick member 22, which may be used in removing the ordinary pasteboard milk bottle top.

The mode of operation of a device embodying my invention is as follows:

The milk bottle pasteboard top having been removed, the closure, after positioning the gasket 15, may be applied by pressing the top member 8 down upon the top of the bottle 10. Forthwith, the pouring of the milk is freed of all danger of coming in contact with the possibly contaminated portion of the top of the milk bottle, because the inner flange 17 presses against the inner edge 18 of the milk bottle and therefore the milk cannot in any wise come in contact with any of the exposed top portion of the bottle, since the downwardly directed flange 17 of the gasket extends downwardly to a point on the bottle opposite the under side of the pasteboard top. In this manner, a closure is provided, which provides for the pouring of the milk from the center of the bottle and positively precludes the milk from coming in contact with the upper inner edge portion or top portion of the bottle. The closure thereby provides a sanitary device which may be readily applied to milk bottles not only as used in the home but when used at picnics, and when the lunches are carried, and a container other than the milk bottle itself may not be readily at hand. Also, it is manifest that the extra labor of washing and cleaning a separate milk pitcher is avoided.

Finally, it is manifest that the device is characterized by its ease of manufacture, there being but three parts,—the gasket, the top member, and the cover.

Obviously, changes may be made in the form, dimensions and arrangement of the parts of my invention, without departing from the principle thereof, the above setting forth only preferred forms of embodiment.

I claim:—

1. A bottle container closure having a top member provided with means to releasably secure the said member to the top of the container whereby it can be applied repeatedly, said member having a vertically directed flange disposed about the edge of an axially disposed opening in said member; and a cover hingedly mounted on said member and operatively disposed to rest thereon and in spaced relation to said vertically directed flange while completely covering said flange.

2. The combination of a bottle container and a closure for the same having a top member provided with means to releasably secure the said member to the top of the container, said member having a vertically directed flange disposed about the edge of an axially disposed opening, and a cover hingedly mounted on said member and operatively disposed to rest thereon and in spaced relation to said vertically directed flange while completely covering said flange; and a rubber gasket disposed between the top of said container and the under side of said top member.

3. The combination of a bottle container and a closure for the same having a top member provided with means to releasably secure the said member to the top of the container, and a cover hingedly mounted on said member and operatively disposed to rest thereon and in spaced relation to said vertically directed flange while completely covering said flange; and a rubber gasket disposed between the top of said bottle and the under side of said member, said gasket having a downwardly directed flange disposed to press against the inner edge of the top portion of the bottle, whereby the contents of the container are prevented from coming in contact with the top portion of the container which may have become insanitary prior to the application of the said closure, and whereby said gasket provides means for pouring the contents from the center portion of the container.

In witness whereof, I hereunto subscribe my name this 21st day of May, 1926.

HOMER A. SUDDS.